(12) United States Patent
Schoenecker et al.

(10) Patent No.: US 7,185,456 B1
(45) Date of Patent: Mar. 6, 2007

(54) ICE FISHING APPARATUS

(76) Inventors: Scott J. Schoenecker, 20569 County Rd. 71, Richmond, MN (US) 56368; Wayne A. Meyer, 20569 County Rd. 71, Richmond, MN (US) 56368

( * ) Notice: Subject to any disclaimer, the term of this patent is extended or adjusted under 35 U.S.C. 154(b) by 0 days.

(21) Appl. No.: 11/154,331

(22) Filed: Jun. 17, 2005

(51) Int. Cl.
*A01K 91/06* (2006.01)
*A01K 97/12* (2006.01)

(52) U.S. Cl. .......................................... 43/17
(58) Field of Classification Search ............... 43/4, 43/17; D22/134
See application file for complete search history.

(56) References Cited

U.S. PATENT DOCUMENTS

| | | | | |
|---|---|---|---|---|
| 2,883,784 | A | * | 4/1959 | Obernolte ............... 43/4 |
| 3,025,852 | A | * | 3/1962 | Quilling ............ 126/271.2 R |
| 3,030,122 | A | * | 4/1962 | Madera ............... 280/28.12 |
| 3,170,458 | A | * | 2/1965 | Anderlie .............. 126/271.3 |
| 4,253,262 | A | | 3/1981 | Johnson |
| 4,662,099 | A | | 5/1987 | Stewart |
| 4,780,979 | A | * | 11/1988 | Dyck et al. ............... 43/17 |
| 4,794,718 | A | * | 1/1989 | Tillman ................... 43/4 |
| 4,845,878 | A | * | 7/1989 | Hackel .................... 43/17 |
| 4,945,668 | A | * | 8/1990 | Keller .................... 43/17 |
| 4,953,317 | A | * | 9/1990 | Ruchel ................... 43/17 |
| 4,980,986 | A | * | 1/1991 | Harper ................... 43/17 |
| D317,195 | S | | 5/1991 | Hackel |
| 5,598,656 | A | * | 2/1997 | Strasser ................... 43/17 |
| 6,088,945 | A | * | 7/2000 | Sanderfoot ................ 43/4 |
| 2003/0145508 | A1 | * | 8/2003 | Pieczynski ................ 43/17 |

* cited by examiner

*Primary Examiner*—Kurt Rowan

(57) ABSTRACT

An ice fishing apparatus includes a housing that includes a peripheral wall having an upper edge and a lower edge. A covering is positioned on the upper edge. The covering has an aperture extending therethrough. A fishing reel is attached to the cover adjacent to the aperture. A flexible post is attached to the cover and is positioned for being engaged to the reel such that the post is released from the reel when the reel rotates in a first direction. A plate is attached to an inner surface of the peripheral wall and extends away therefrom such that the plate is horizontally orientated. A heat emitter is removably positionable in the housing. The heat emitter is positioned on the plate. The housing is positioned over the ice opening so that the heat emitter warms an interior of the housing and prevents ice from forming over the ice opening.

1 Claim, 6 Drawing Sheets

US 7,185,456 B1

ICE FISHING APPARATUS

BACKGROUND OF THE INVENTION

1. Field of the Invention

The present invention relates to ice fishing devices and more particularly pertains to a new ice fishing device for positioning over an opening in a layer of ice to prevent the ice from freezing over.

2. Description of the Prior Art

The use of ice fishing devices is known in the prior art. U.S. Pat. No. 4,945,668 describes a device having an internal reel and heating assembly for allowing a person to fish through an ice hole and to prevent the freezing over the ice hole. Another type of ice fishing device is U.S. Pat. No. 5,598,656 which includes an insulated housing having a tip assembly therein. Yet another ice fishing assembly for preventing ice build up in an ice-fishing hole is U.S. Pat. No. 4,662,099.

While these devices fulfill their respective, particular objectives and requirements, the need remains for a device that includes a housing that is easily heated and positionable over an ice-fishing hole to ensure that the ice hole does not easily freeze over. The housing should also include a lighting system to aid an angler in seeing an interior of the housing while igniting a heat emitter or when a fish is hooked.

SUMMARY OF THE INVENTION

The present invention meets the needs presented above by generally comprising a housing that includes a peripheral wall having an upper edge and a lower edge. A covering is positioned on the upper edge. The covering has an aperture extending therethrough that has a diameter greater than ½ inch. A fishing reel is attached to the cover and positioned adjacent to the aperture. A flexible post is attached to the cover and is positioned for being selectively engaged to the reel such that the post is released from the reel when the reel rotates in a first direction. A plate is attached to an inner surface of the peripheral wall and extends away therefrom such that the plate is horizontally orientated. A heat emitter is removably positionable in the housing. The heat emitter is positioned on the plate. The housing is positioned over the ice opening so that the heat emitter warms an interior of the housing and prevents ice from forming over the ice opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
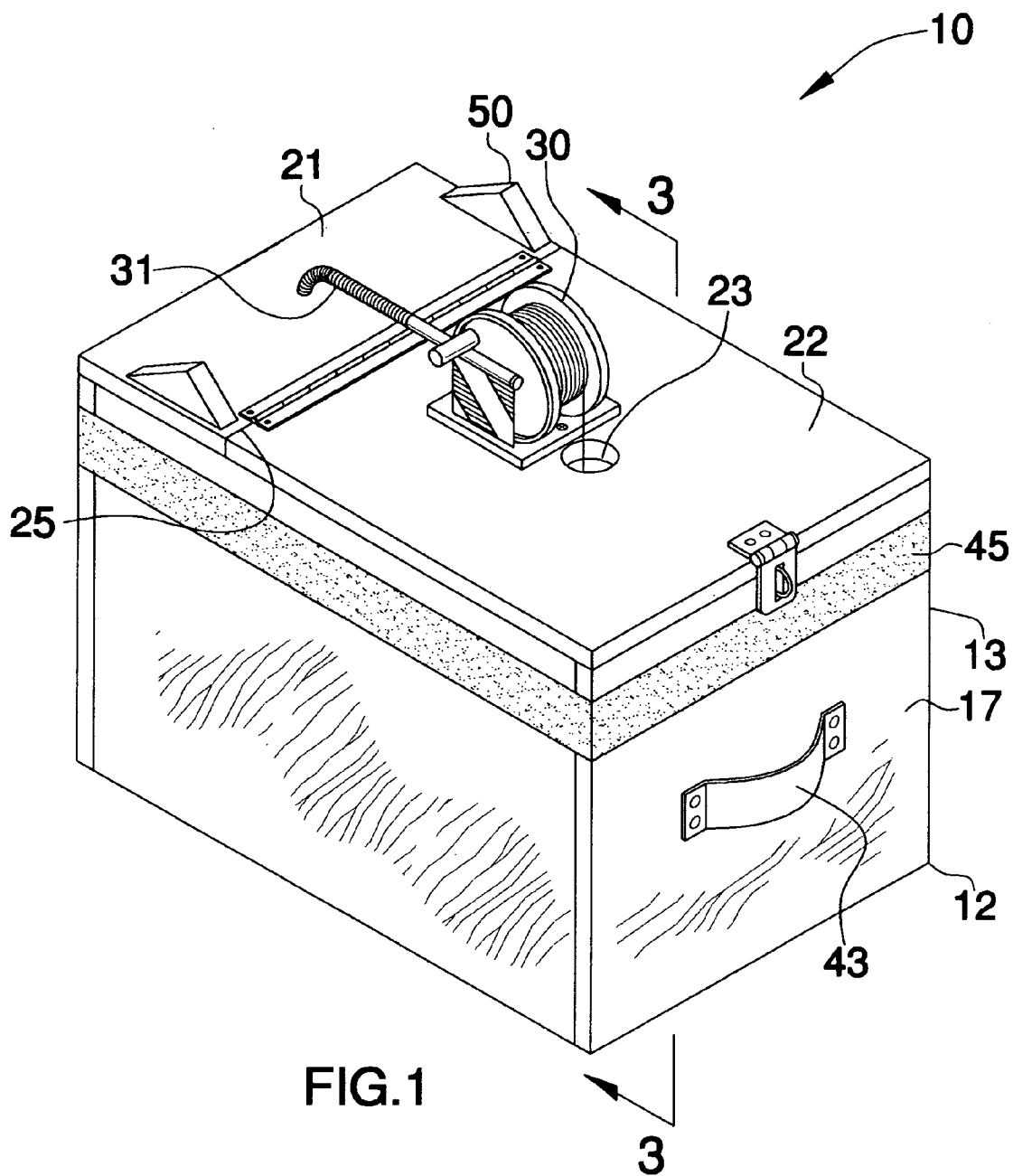
FIG. 1 is a perspective view of an ice fishing apparatus according to the present invention.
Figure 2:
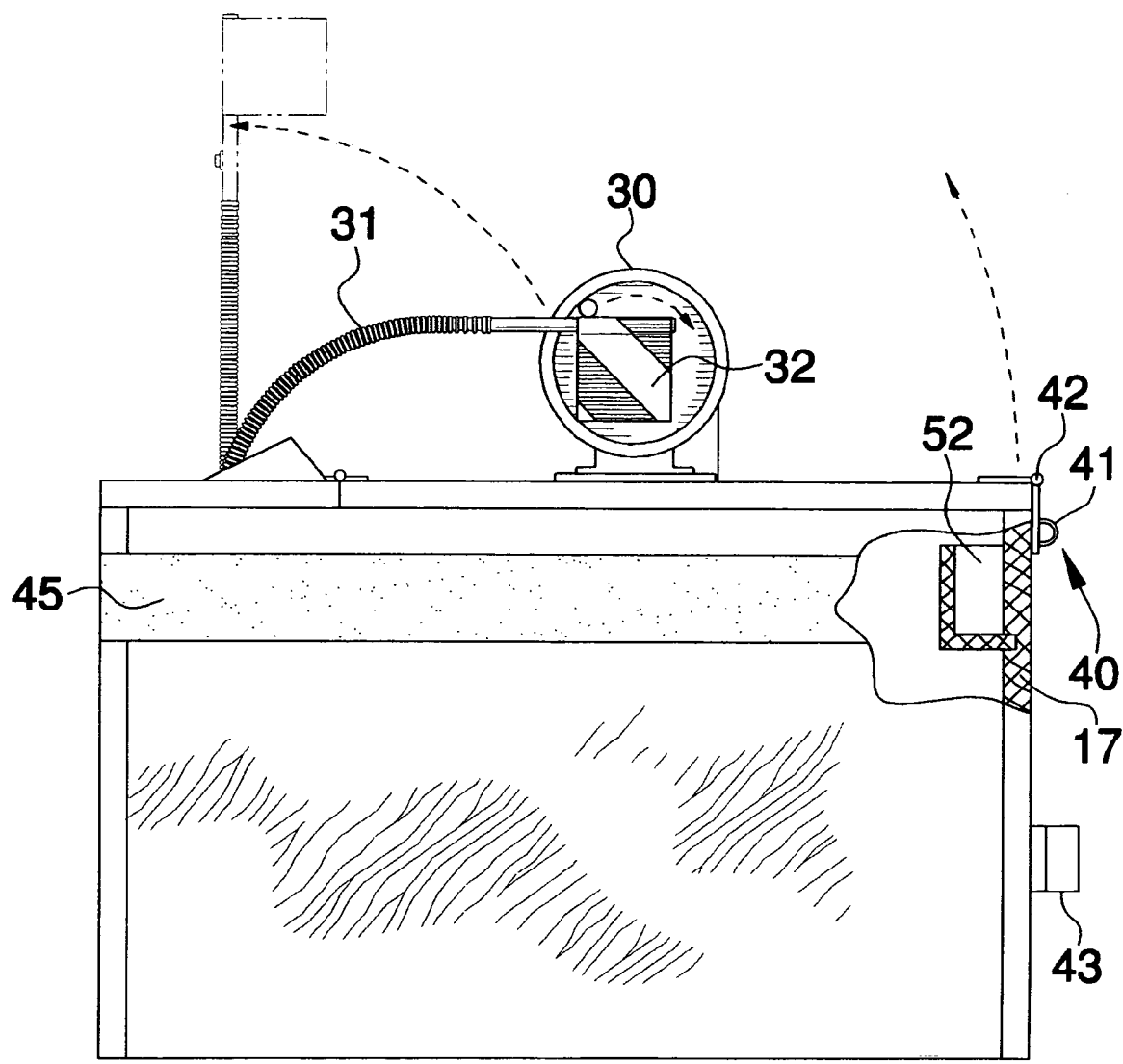
FIG. 2 is a side view of the present invention.
Figure 3:
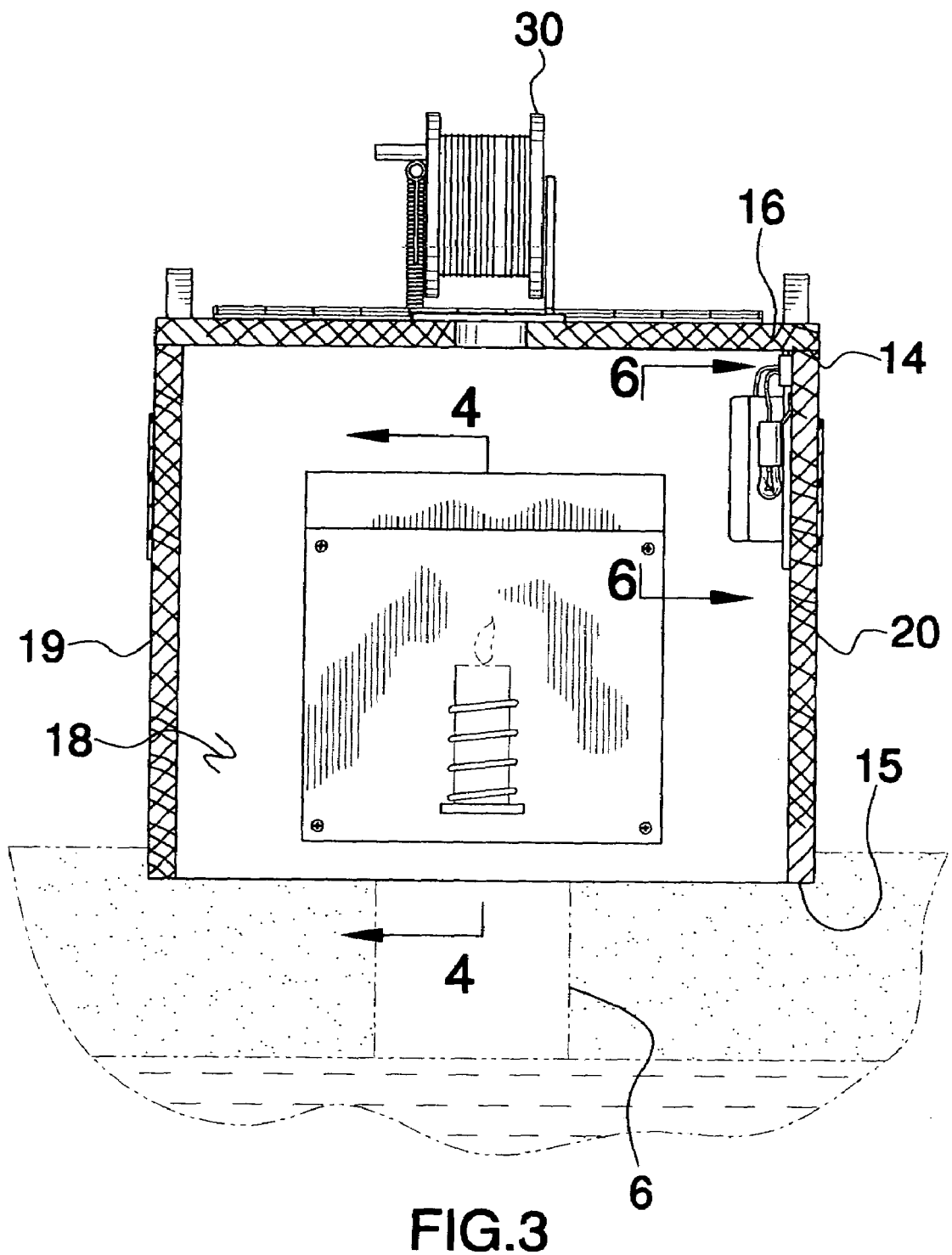
FIG. 3 is a cross-sectional view taken along line 3—3 of FIG. 1 of the present invention.
Figure 4:
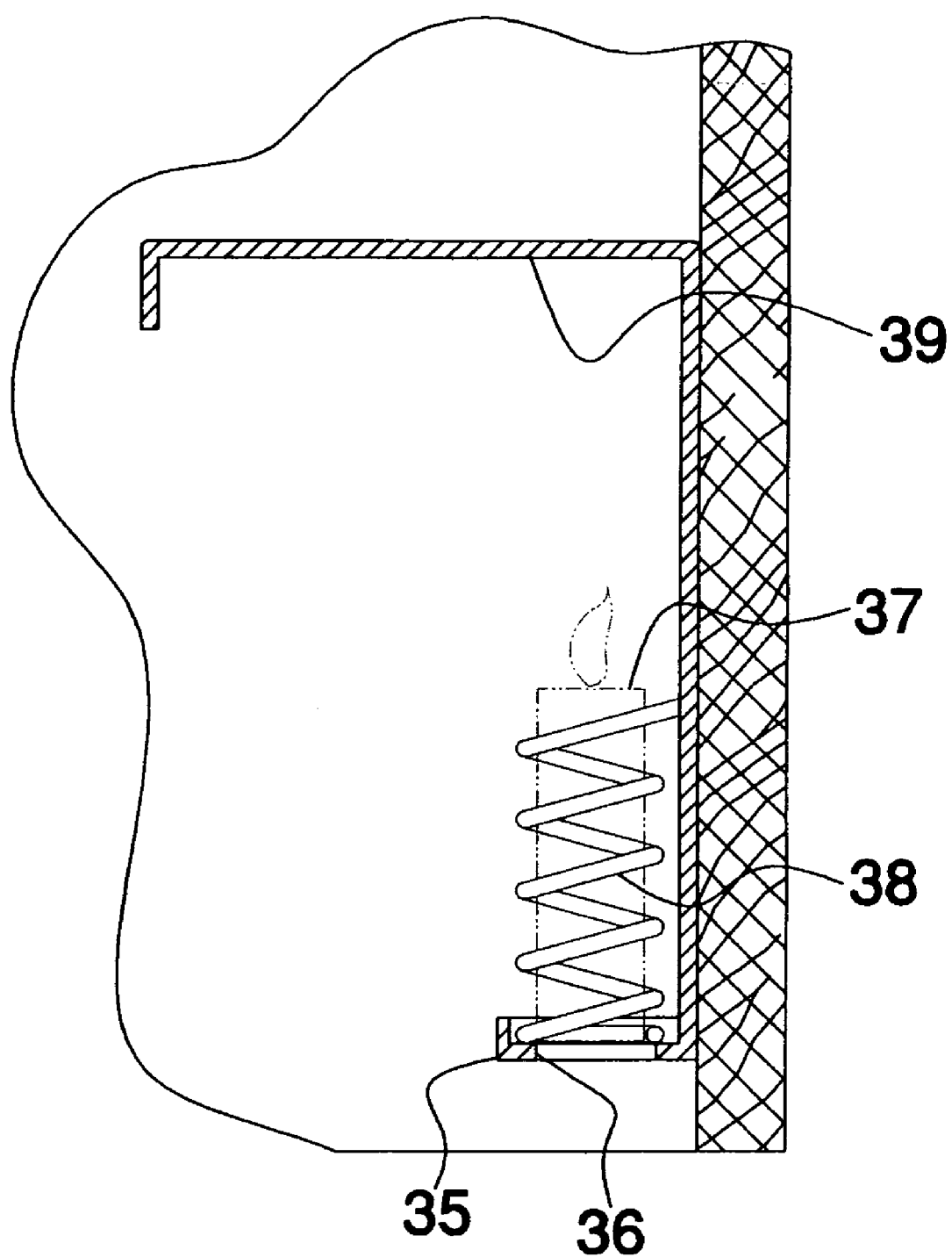
FIG. 4 is a cross-sectional view taken along line 4—4 of FIG. 3 of the present invention.
Figure 5:
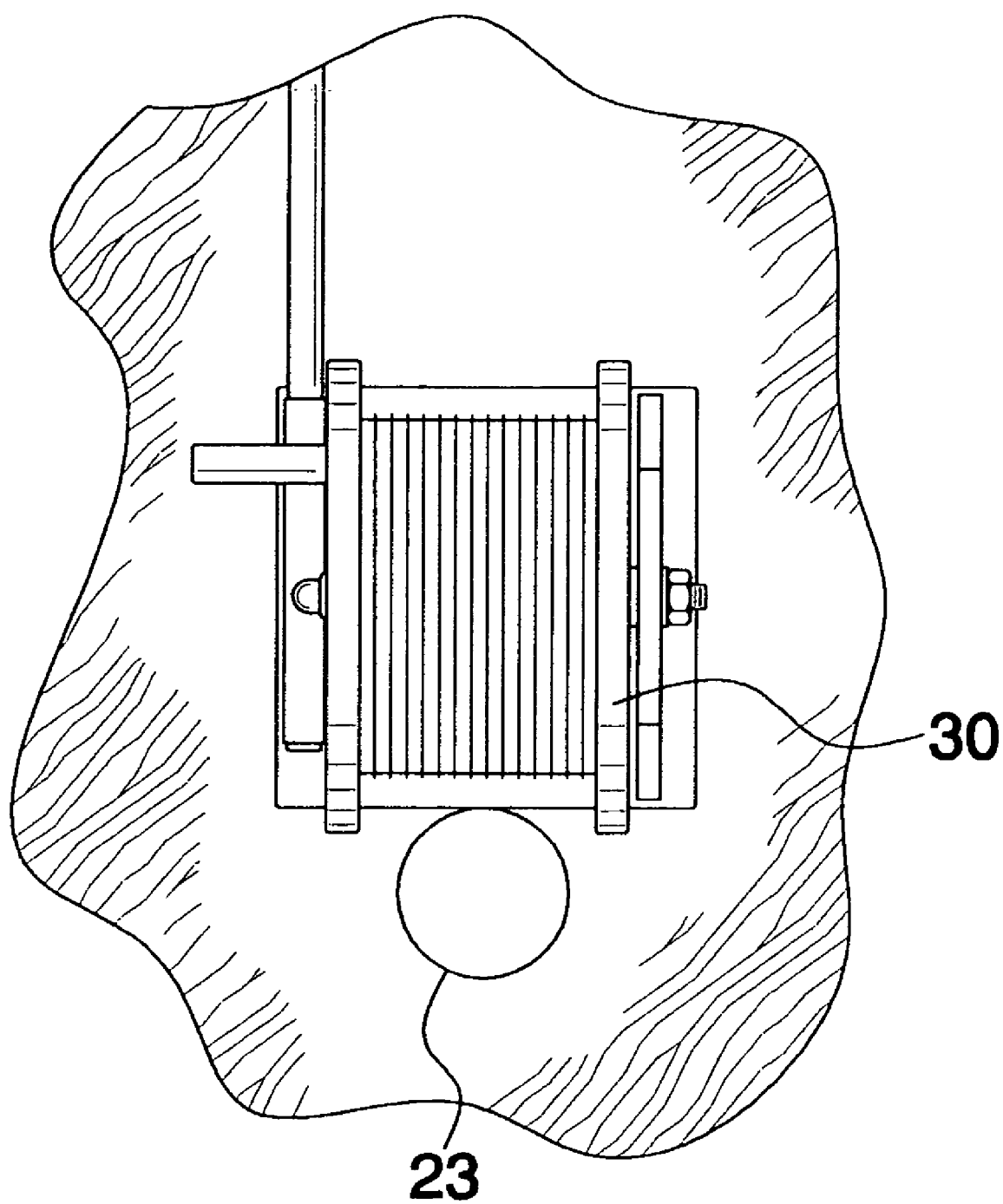
FIG. 5 is a top view of a fishing reel the present invention.
Figure 6:
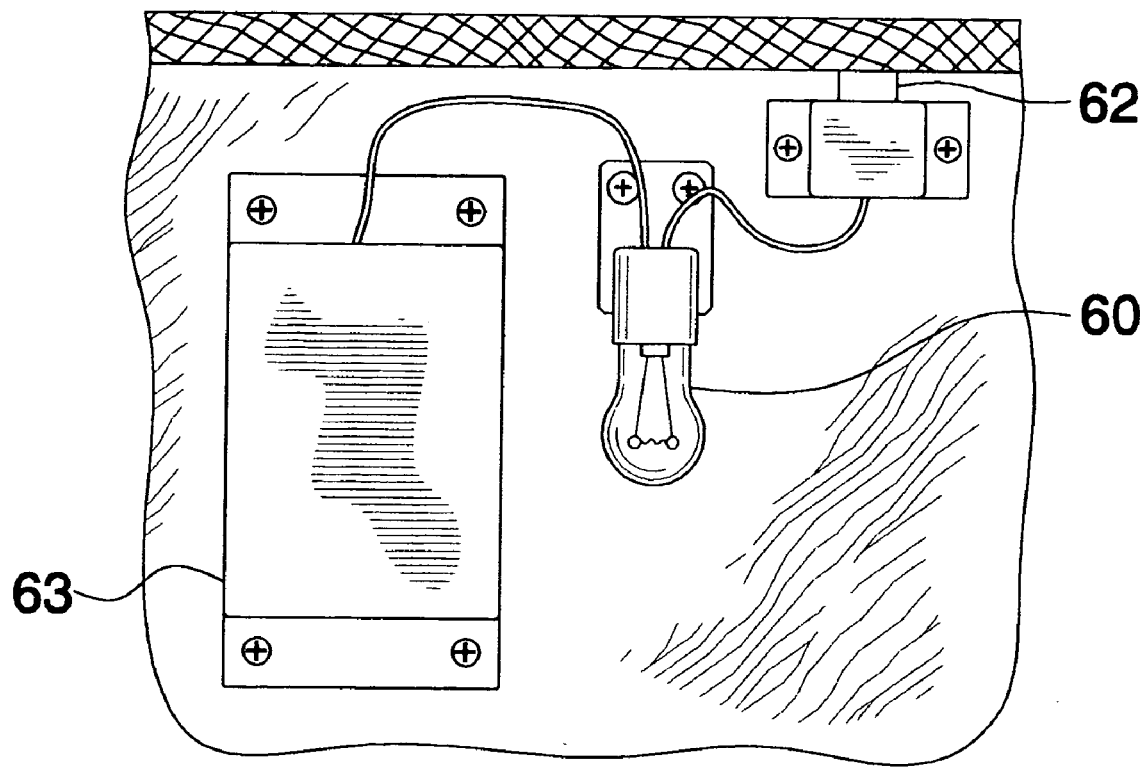
FIG. 6 is a cross-sectional view taken along line 6—6 of FIG. 3 the present invention.

With reference now to the drawings, and in particular to FIGS. 1 through 6 thereof, a new ice fishing device embodying the principles and concepts of the present invention and generally designated by the reference numeral 10 will be described.

As best illustrated in FIGS. 1 through 6, the ice fishing apparatus 10 generally comprises a housing 12 that includes a peripheral wall 13 having an upper edge 14 and a lower edge 15. A covering 16 is positioned on the upper edge 14. The peripheral wall 13 includes a front wall 17, a back wall 18, a first side wall 19 and a second side wall 20. The covering 16 includes a first portion 21 and a second portion 22 hingedly coupled together along a break 25 that is orientated perpendicular to the first 19 and second 20 side walls. The first portion 21 is positioned adjacent to the back wall 18 and the second portion 22 is positioned adjacent to the front wall 17. The second portion 22 has an aperture 23 extending therethrough. The aperture 23 has a diameter greater than ½ inch and preferably less than 3 inches. The housing 12 has a height generally between 8 inches and 16 inches, a width between the first 19 and second 20 side walls generally between 8 inches and 16 inches, and a length greater than 12 inches.

A fishing reel 30 is attached to the cover 16. The fishing reel 30 is positioned adjacent to the aperture 23 and between the aperture 23 and the break 25. A flexible post 31 is attached to the first portion 21 of the cover 16 and is positioned for being selectively engaged to the reel 30 so that the post 31 is released from the reel 30 when the reel 30 rotates in a first direction. The post 31 has a free end having a flag 32 attached thereto. The post 31 acts as a pop-up fish strike indicator, though other strike indicators may be used such as an external light wired to a power supply mounted within the housing 12. Alternatively, a transmitter may be mechanically coupled to the post or other strike indicator for sending a wireless signal to a receiver electrically coupled to an alarm. The post 31 and fishing reel 30 are generally conventional of the type used for ice fishing, though alternate fishing reels may also be used.

A plate 35 is attached to an inner surface of the peripheral wall 13 and extends away therefrom so that the plate 35 is horizontally orientated. The plate 35 has a hole 36 extending therethrough. The plate 35 is positioned on the back wall 18. A heat emitter 37 is removably positionable in the housing 12. The heat emitter 37 is positioned on the plate 35. The heat emitter 37 preferably comprises a candle, though a propane fueled heater, an oil fueled heater or other type of heater may be used instead. A coupler 38 is attached to the peripheral wall 13 and is adapted for stabilizing the heat emitter 37 on the plate 35. The coupler 38 comprises a coiled spring that is removably extendable around and abuttable against the heat emitter 37. A heat shield 39 is mounted to the inner surface of the peripheral wall 13 and is positioned above and spaced from the plate 35. As shown in the figures, the heat shield 39, plate, 35 and coupler 38 may comprise one unit.

A securing member 40 is attached to the housing 12 and is adapted for releasably securing the cover 16 to the front wall 17. The securing member 40 includes a loop 41 attached to the front wall 17. A latch 42 secures the loop 40 to the front wall 17. A handle 43 is attached to the front wall 17. The securing member 40 retains the cover 16 on the housing 12 when the handle 43 is being used to transport the housing 12.

A reflective strip 45 is attached to and extends around an outer surface of the perimeter wall 13. The strip 45 is positioned adjacent to the upper edge 14. The reflective strip 45 aids in increasing the visibility of the housing 12 to snowmobiles and vehicles driving on a frozen lake.

At least one brace 50 is attached to an upper surface of the first portion 21 and is adapted for retaining an angle between the first 21 and second 22 portions equal to at least 60 degrees. The brace 50 ensures that the post 31 is not bent at its base to protect the post 31 from being broken away from the cover 16 or bent in such a manner that it looses its resiliency.

A container 52 is attached to the inner surface of the peripheral wall 13. The container 52 is positioned adjacent to the top edge 14 and is positioned on the front wall 17. The container 52 may be used for holding tackle as well as additional candles.

A light emitter 60 is mounted in the housing 12. An actuator 61 is electrically coupled to the light emitter 60 for selectively turning the light emitter 60 on or off. The actuator 62 is a pressure sensitive switch. The cover 16 engages the actuator 62 and biases the actuator 62 into an off position when the cover 16 abuts the top edge 14. The actuator 62 is positioned in an on position when the cover 16 is spaced from the top edge 14. The light emitter 60 is preferably powered with a battery mounted in a battery housing 63 on the peripheral wall 13.

In use, an ice opening 6 is drilled through the ice and the housing 12 is positioned over the ice opening 6. The heat emitter 37 warms an interior of the housing 12 which prevents ice from forming over the ice opening 6. Fishing line is released from the reel 30 and extended through the aperture 23 and ice opening 6. When a fish is caught, the cover 16 may be lifted or removed to retrieve a fish. The light emitter 60 provides light for an angler to see the interior of the housing 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An ice fishing assembly adapted for preventing an ice opening from freezing over, said assembly comprising:

a housing including a peripheral wall having an upper edge and a lower edge, a covering being positioned on said upper edge, said peripheral wall including a front wall, a back wall, a first side wall and a second side wall, said covering including a first portion and a second portion hingedly coupled together along a break orientated perpendicular to said first and second side walls, said first portion being positioned adjacent to said back wall, said second portion being positioned adjacent to said front wall, said second portion having an aperture extending therethrough, said aperture having a diameter greater than ½ inch, said housing having a height generally between 8 inches and 16 inches, a width between said first and second side walls generally between 8 inches and 16 inches, and a length greater than 12 inches;

a fishing reel being attached to said cover, said fishing reel being positioned adjacent to said aperture and between said aperture and said break;

a flexible post being attached to said cover and being positioned for being selectively engaged to said reel such that said post is released from said reel when said reel rotates in a first direction, said post having a free end having a flag attached thereto, said post being attached to said first portion;

a plate being attached to an inner surface of said peripheral wall and extending away therefrom such that said plate is horizontally orientated, said plate having a hole extending therethrough, said plate being positioned on said back wall;

a heat emitter being removably positionable in said housing, said heat emitter being positioned on said plate, said heat emitter comprising a candle;

a coupler being attached to said peripheral wall and being adapted for stabilizing said heat emitter on said plate, said coupler comprising a coiled spring being removably extendable around and abuttable against said heat emitter;

a heat shield is mounted to said inner surface of said peripheral wall and is positioned above and spaced from said plate;

a securing member being attached to said housing and being adapted for releasably securing said cover to said front wall;

a handle being attached to said front wall;

a reflective strip being attached to and extending around an outer surface of said perimeter wall, said strip being positioned adjacent to said upper edge;

at least one brace being attached to an upper surface of said first portion and being adapted for retaining an angle between said first and second portions equal to at least 60 degrees;

a container being attached to said inner surface of said peripheral wall, said container being positioned adjacent to said top edge, said container being positioned on said front wall;

a light emitter being mounted in said housing, an actuator being electrically coupled to said light emitter for selectively turning said light emitter on or off, said actuator being a pressure sensitive switch, said cover engaging said actuator and biasing said actuator into an off position when said cover is abutting said top edge, said actuator being positioned in an on position when said cover is spaced from said top edge; and wherein said housing is positioned over the ice opening such that the heat emitter warms an interior of said housing and prevents ice from forming over said ice opening.

* * * * *